(12) United States Patent
Quilapquilap

(10) Patent No.: US 7,650,686 B2
(45) Date of Patent: Jan. 26, 2010

(54) SERVO TRACK WRITER CLOCKHEAD RADIUS JIG

(75) Inventor: Teodosio Quilapquilap, Metro Manila (PH)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 193 days.

(21) Appl. No.: 12/005,962

(22) Filed: Dec. 28, 2007

(65) Prior Publication Data
US 2009/0168223 A1 Jul. 2, 2009

(51) Int. Cl.
G11B 5/127 (2006.01)

(52) U.S. Cl. ............ 29/603.05; 29/603.01; 29/603.04; 29/603.08; 29/603.11; 29/737

(58) Field of Classification Search .............. 29/603.01, 29/603.03, 603.4, 603.08, 603.09, 603.11, 29/737, 603.05; 360/77.02
See application file for complete search history.

(56) References Cited

U.S. PATENT DOCUMENTS

| 5,760,989 | A | | 6/1998 | Colban |
| 6,081,990 | A | * | 7/2000 | Kuroba et al. ............ 29/603.01 |
| 6,304,406 | B1 | | 10/2001 | Douglas et al. |
| 6,304,407 | B1 | * | 10/2001 | Baker et al. .................... 360/75 |
| 6,751,044 | B1 | | 6/2004 | Meeks et al. |
| 6,904,010 | B1 | * | 6/2005 | Kuroba et al. ............... 369/53.3 |
| 6,958,874 | B1 | * | 10/2005 | Gerrard et al. ................. 360/60 |
| 6,965,491 | B1 | | 11/2005 | Perlmutter et al. |
| 7,307,807 | B1 | * | 12/2007 | Han et al. ...................... 360/75 |
| 2001/0040752 | A1 | * | 11/2001 | Szita et al. ............... 360/77.04 |
| 2004/0125488 | A1 | * | 7/2004 | Zhu et al. ...................... 360/75 |
| 2007/0263312 | A1 | * | 11/2007 | Hara et al. ..................... 360/69 |

FOREIGN PATENT DOCUMENTS

| JP | 56013564 | 2/1981 |
| WO | WO-8904040 | 5/1989 |
| WO | WO-9628814 | 9/1996 |

OTHER PUBLICATIONS

Nakayama, et al., "Servotrack Writing System Using Dual Laser Scales for High Track-Per-Inch Recording", IEEE on Transactions on Magnetics, vol. 40, No. 4, (Jul. 2004),3123-3126.
Guo, et al., "Feedforward Control For Reducing Disk-Flutter-Induced Track Misregistration", IEEE Transactions on Magnetics, vol. 39, No. 4, (Jul. 2003),2103-2108.
Liu, et al., "Study of Clock Head/Disk Interface Failure Mechanism in Servo-Writing Process", IEEE Transactions on Magnetics, vol. 34, No. 4, (Jul. 1998),1723-1725.

* cited by examiner

Primary Examiner—Derris H Banks
Assistant Examiner—Dan D Le

(57) ABSTRACT

A servo track writer (STW) clockhead radius jig is disclosed. One embodiment provides a hard disk drive assembly including a base having a cutaway portion to provide visual access therein. In addition, a disk is mounted in the hard disk drive assembly, this disk having an indicator thereon to indicate a required radius setting for a clockhead.

8 Claims, 4 Drawing Sheets

SERVO TRACK WRITER CLOCKHEAD RADIUS JIG

TECHNICAL FIELD

The present invention relates generally to a method for writing servo patterns on a data disk storage device, and more particularly, to servo track writer (STW) clockhead radius jig.

BACKGROUND ART

In many processing and computing systems, magnetic data storage devices, such as disk drives are utilized for storing data. A typical disk drive includes a spindle motor having a rotor for rotating one or more data disks having data storage surfaces, and an actuator for moving a head carrier arm that supports transducer (read/write) heads, radially across the data disks to write data to or read data from concentric data tracks on the data disk.

In general, a magnetic transducer head is positioned very close to each data storage disk surface by a slider suspended upon an air bearing. The close proximity of the head to the disk surface allows recording of very high resolution data and servo patterns, on the disk surface. Servo patterns are typically written with uniform angular spacing of servo sectors and interleaved data sectors or blocks. An example servo pattern includes circumferentially sequential, radially staggered single frequency bursts. Some servo patterns provide the disk drive with clock information or head position information to enable the actuator, such as a rotary voice coil motor to move the head from starting tracks to destination tracks during random access track seeking operations.

The servo clock pattern is typically written to a disk at a point in the drive assembly process before the hard disk unit is sealed against particulate contamination from the ambient environment. For example, the clock pattern may be written at the manufacturer's location using a servo track writer (STW) machine.

However, the present state of adjusting the radius for the clockhead servo writer is significant and costly in both time and manufacture. For example, presently the clockhead is installed in the STW machine and must be replaced after it has written an established number of clock patterns on hard disk drives, fails in operation, or the like. After the clockhead is installed, an actual head disk assembly (HDA) is mounted on the STW machine. The clockhead writes the clock pattern on the HDA and the HDA is dismounted and disassembled. The disk is cleaned with soap and water and then the disk surface is coated with a ferrofluid and allowed to dry. When dry, the ferrofluid solution becomes visible and the clock pattern can be viewed and measured through a microscope.

The clockhead is adjusted based on the measurements and the process is repeated with another HDA until the measurements of the clock pattern are within tolerance. At that time, the clockhead is used to write the clock pattern on HDA's during the manufacturing process until the life of the clockhead is complete, or failure occurs. Then, a new clockhead is installed in the STW machine and the calibration process is repeated.

Thus, the present method for calibrating the clockhead in the STW machine results in an actual HDA, or components therein, being discarded or rendered to scrap. In addition, the process is tedious and time consuming. The present method also generates waste in the form of electrical, chemical, component, manufacturing time and manpower. There is also significant lost manufacturing time during the downtime associated with the clockhead calibration process.

A method for streamlining the process and reducing manufacturing costs, waste and time is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A servo track writer (STW) clockhead radius jig is disclosed. One embodiment provides a hard disk drive assembly including a base having a cutaway portion to provide visual access therein. In addition, a disk is mounted in the hard disk drive assembly, this disk having an indicator thereon to indicate a required radius setting for a clockhead.

BRIEF DESCRIPTION OF THE DRAWINGS

The accompanying drawings, which are incorporated in and constitute a part of the specification, illustrate embodiments of the invention, and together with the general description given above and the detailed description given below serve to explain the teachings of the invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for manufacturing and utilizing an STW clockhead radius jig.

Overview

Manufacturing disk drives is very competitive business. Disk drives can be sold at lower prices when they are manufactured more quickly. Therefore, the company that can manufacture disk drives the quickest has a significant competitive advantage over their competitors.

The present invention provides an STW clockhead radius jig for adjusting a clockhead mounted on a STW work base. By utilizing the clockhead radius jig, the clockhead can be adjusted while the jig remains mounted thereby decreasing the overall time for replacing and aligning the clockhead.

By utilizing the jig, there is no need for wasting an actual HDA, or components associated therewith during the calibrating process. In addition, the alignment time is significantly decreased. The present method also generates little or no waste in the form of electrical, chemical, component, manufacturing time and manpower. There is also significantly increased manufacturing time as the downtime associated with the clockhead calibration process is significantly reduced.

Disk Drive

Figure 1:
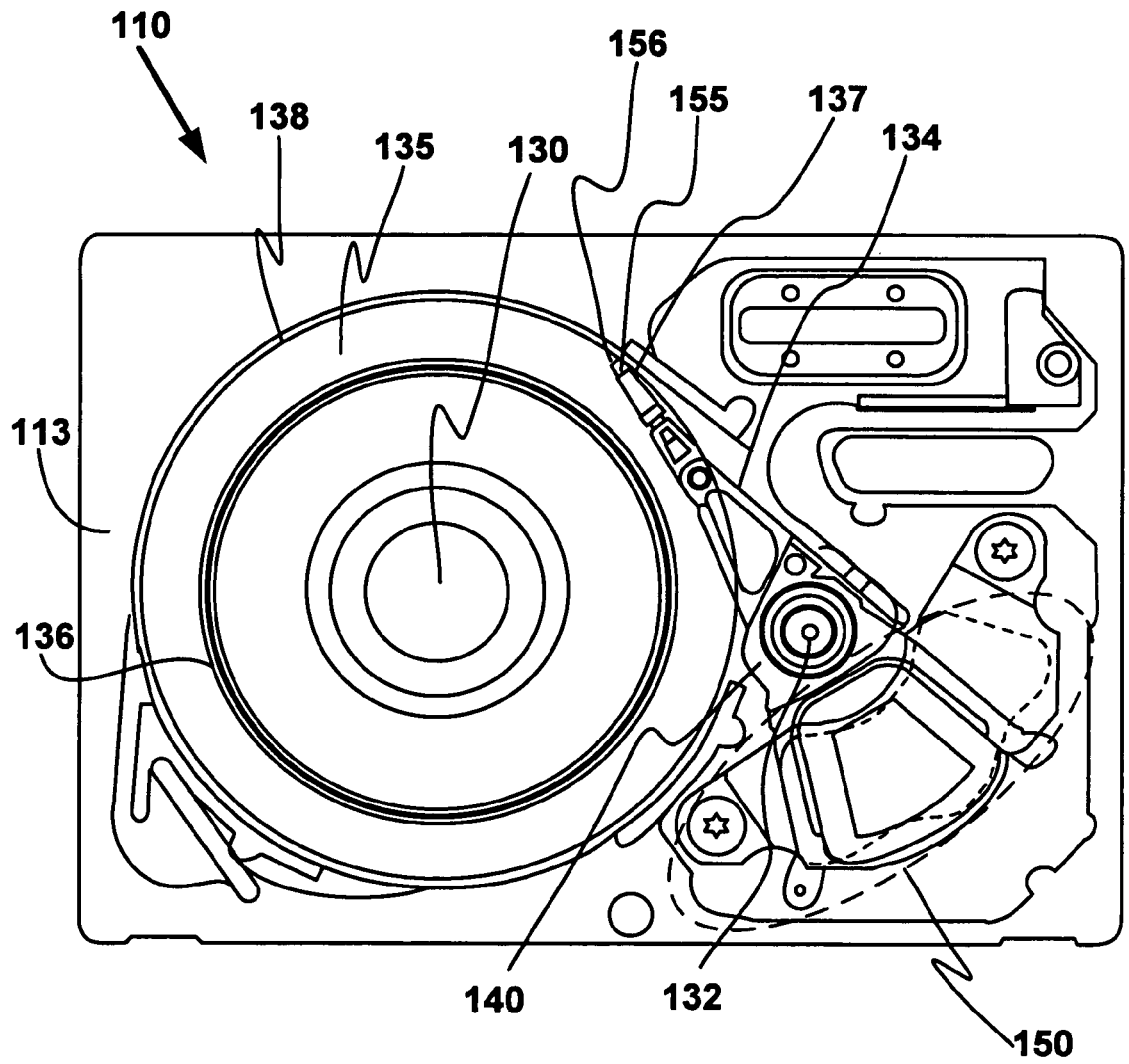
FIG. 1 is a plan view of an HDD with cover and top magnet removed in accordance with one embodiment of the present invention.

With reference now to FIG. 1, a plan view of a disk drive 110 is provided in accordance with one embodiment of the present invention. Disk drive 110 includes a base casting 113, a motor hub assembly 130, a disk 138, actuator shaft 132, actuator arm 134, suspension assembly 137, a hub 140, voice coil motor 150, a magnetic head 156, and a slider 155.

In general, the components are assembled into a base casting 113, which provides attachment and registration points for components and sub assemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 138's surface 135 for reading and writing data with magnetic heads 156 (one shown). The rotary voice coil motor 150 rotates actuator arms 135 about the actuator shaft 132 in order to move the suspension assemblies 150 to the desired radial position on a disk 138. The actuator shaft 132, hub 140, actuator arms 134, and voice coil motor 150 may be referred to collectively as a rotary actuator assembly.

Data is recorded onto the disk's surface 135 in a pattern of concentric rings known as data tracks 136. The disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. It is appreciated that what is described for one head-disk combination may also be applied to multiple head-disk combinations, such as disk stacks (not shown). However, for purposes of brevity and clarity, FIG. 1 only shows one head and one disk surface.

Typically, data is read from and written to a disk of a disk drive in circular tracks. Pieces of circular track positioning information (CTPI) are typically written to a disk for example at the manufacturers, to facilitate reading data from and writing data to the disk. The pieces of CTPI can form a pattern. The pieces of CTPI are commonly referred to as "servo bursts" and the pattern is commonly referred to as a "servo pattern." The servo pattern is used during operation of the disk drive to ensure that the head of the disk drive is centered over the desired track of data. For example, the servo pattern is used to determine where to write data to and where to read data from. The process of writing the servo pattern to a disk is commonly referred to as "servo write."

For example, a magnetic transducer head is positioned very close to each data storage disk surface by a slider suspended upon an air bearing. The close proximity of the head to the disk surface allows recording of very high resolution data and servo patterns, on the disk surface. Servo patterns are typically written with uniform angular spacing of servo sectors and interleaved data sectors or blocks. An example servo pattern includes circumferentially sequential, radially staggered single frequency bursts. Some servo patterns provide the disk drive with clock information or head position information to enable the actuator, such as a rotary voice coil motor to move the head from starting tracks to destination tracks during random access track seeking operations.

Data transducer heads currently in use employ dual elements. An inductive write element having a relatively wide recording gap is used to write information into the data tracks, and a read element such as a magneto-resistive sensor having a relatively narrow playback gap is used to read information from the data tracks. With this arrangement data track densities equaling and exceeding for example 30,000 tracks per inch are possible.

A "servo clock pattern" is typically written to a disk for example at the manufacturers to facilitate start-stop timing in writing servo patterns on the disk. Typically, data is read from and written to the disk of a disk drive in circular tracks. Servo clock patterns are written onto the disk using a clockhead at a point in the drive assembly process before the hard disk unit is sealed against particulate contamination from the ambient.

Figure 2:
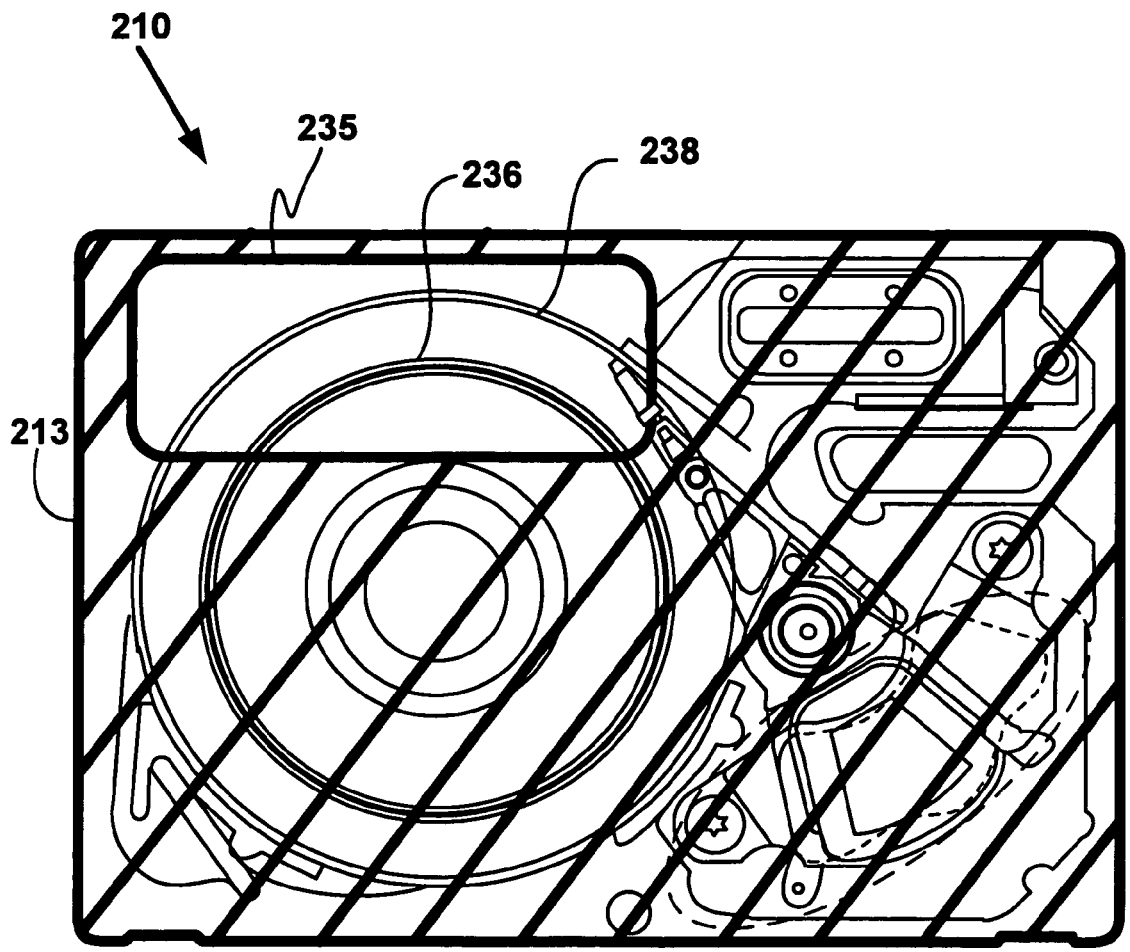
FIG. 2 is a block diagram illustration of an STW clockhead radius jig according to one embodiment of the present invention.

Referring now to FIG. 2, a block diagram of an STW clockhead radius jig is shown in accordance with one embodiment. Jig 210 includes a base and disk assembly similar to the hard disk assembly described in FIG. 1. As such, the parts and components of disk drive 110 that are similar to jig 210 are not described in detail again. However, jig 210 includes a base housing 213 that has an opening 235 therein. Jig 210 also includes a disk 238 that may be transparent or opaque and may be a standard disk or any type of material that is formed to approximate the shape and size of a hard disk drive disk such as disk 138 of FIG. 1. Jig 210 also includes a required radius indicator 236 located on or within disk 238. In one embodiment, required radius indicator 236 is opaque. In another embodiment, required radius indicator 236 is transparent.

Figure 3:
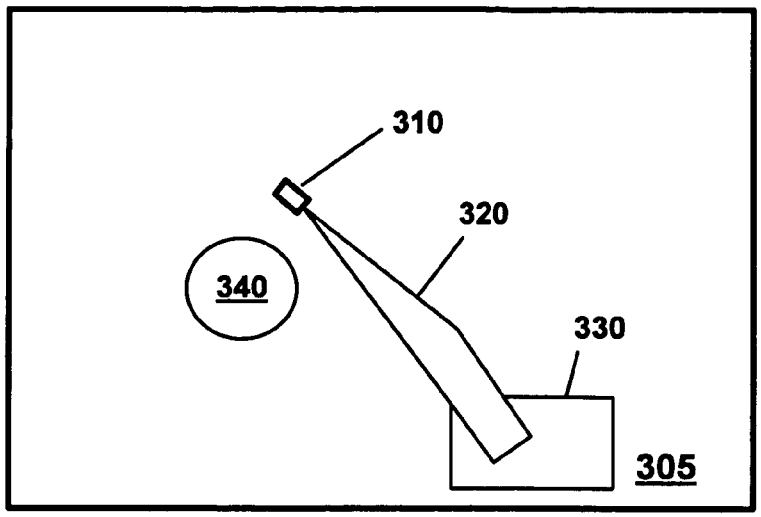
FIG. 3 is a block diagram illustration of an STW work base according to one embodiment of the present invention.

With reference now to FIG. 3, an STW work base is shown in accordance with one embodiment of the present invention. In general, STW work base 305 includes an arm 320 having a clockhead 310 thereon. In addition, a clockhead adjuster 330 is provided. In one embodiment, clockhead adjuster 330 provides automatic adjustment. In another embodiment, clockhead adjuster 330 has manual adjustment inputs. In yet another embodiment, clockhead adjuster 330 has both manual and automatic adjustment capabilities. In general, an adjustment performed on clockhead adjuster 330 will result in an adjustment to the arm 320 and clockhead 310 thereon. By adjusting clockhead adjuster 330, the radius of the clockhead can be adjusted to the proper write radius with respect to center portion 340.

Figure 4:
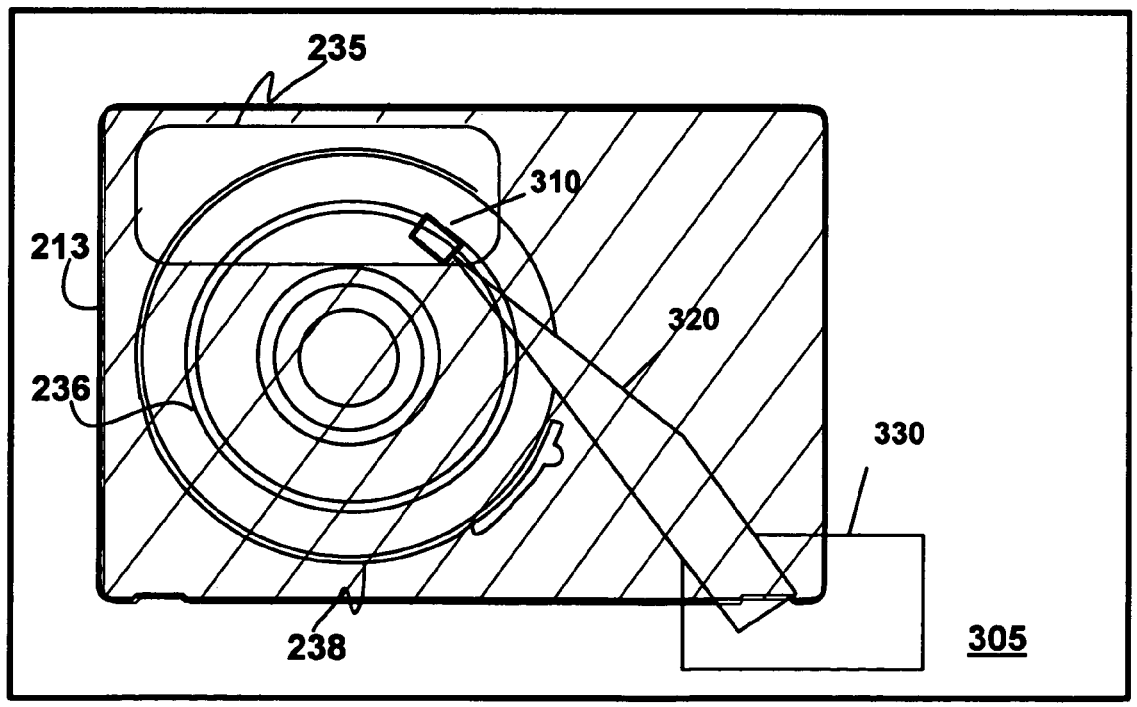
FIG. 4 is a block diagram illustration of an STW clockhead radius jig mounted on an STW work base according to one embodiment of the present invention.

Referring now to FIG. 4, a block diagram illustration of an STW clockhead radius jig 235 mounted on an STW work base 305 is shown in accordance with one embodiment of the present invention.

Figure 5:
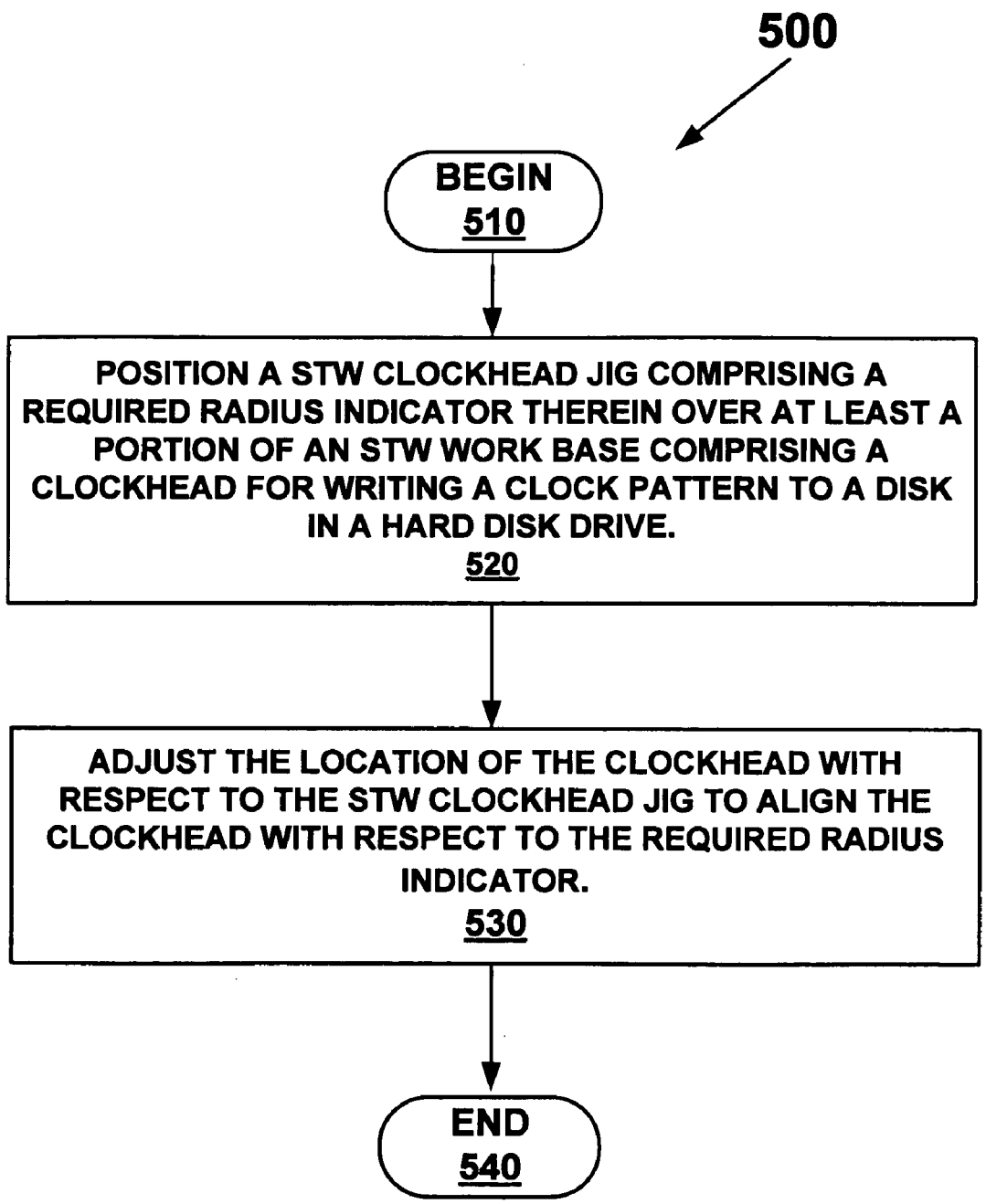
FIG. 5 is a flow diagram illustration a method for utilizing an STW clockhead radius jig in accordance one embodiment of the present invention.

With reference now to FIG. 5, a flowchart 500 providing a method for utilizing an STW clockhead radius jig is provided in accordance with one embodiment of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. The following description of flowchart 500 shall refer to FIG. 4.

At 510 of FIG. 5, the method begins.

With reference now to 520 of FIG. 5 and to FIG. 4, one embodiment positions a STW clockhead 320 jig 235 including a required radius indicator 236 therein over at least a portion of an STW work base 305 including a clockhead 310 for writing a clock pattern to a disk 238 in a hard disk 238 drive. As described herein, one embodiment utilizes a hard disk 238 drive base assembly 238 with a cutaway portion 235 for a base of the STW clockhead jig 235, the cutaway portion 235 providing visual access to a disk 238 within the STW clockhead jig 235.

With reference now to 530 of FIG. 5 and to FIG. 4, one embodiment adjusts the location of the clockhead 320 with respect to the STW clockhead 320 jig 235 to align the clockhead 320 with respect to the required radius indicator 236. For example, clockhead 310 is compared with the indicator 236 on the disk 238. If clockhead 310 is not aligned with the indicator 236, then the clockhead adjuster 330 may be used to adjust the location of the clockhead 310 until clockhead 310 is aligned with indicator 236. In one embodiment, the clockhead adjuster 330 is a manual adjuster 330 for manually adjusting the clockhead 310 alignment with respect to the required radius indicator 236. However, in another embodiment, clockhead adjuster 330 is an auto-adjuster 330 for automatically adjusting the clockhead 320 alignment with respect to the required radius indicator 236.

In one embodiment, a clear disk 238 may be used within the STW clockhead jig 235. The clear disk 238 has a marking thereon to indicate the required radius 236 for the servo clock pattern. In another embodiment, disk 238 has a clear portion within the STW clockhead jig 235, the clear portion indicating the required radius for aligning the clockhead 320. In yet another embodiment, a normal hard disk 238 may be used within the STW clockhead jig 235, the disk 238 having a marking thereon, the marking indicating the required radius for aligning the clockhead 320.

In an additional embodiment, a visual magnifying apparatus may be provided in the opening 235 to provide better visibility when utilizing the STW clockhead jig 235.

At step 540, the method ends.

The process of calibrating the clockhead 310 can be repeated, for example, for calibration testing, when replacing clockhead 310 or any other time. Further, after aligning the clockhead 310, following disk drive assemblies can have the clock pattern written thereto without concern of alignment issues. This method and apparatus is also compatible with present manufacturing methods and techniques and does not necessarily require any adjustments to the present manufacturing methods or tools.

Moreover, various embodiments of the present invention can be used in combination with longitudinal recording as well as perpendicular recording. Manufacturers are trying to make disk drives with higher and higher density. Smaller track widths are used to accomplish higher densities.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of orienting a servo track writer (STW) clockhead, the method comprising:

positioning a STW clockhead jig comprising a required radius indicator therein over at least a portion of an STW work base comprising a clockhead for writing a clock pattern to a disk in a hard disk drive; and adjusting the location of the clockhead with respect to the STW clockhead jig to align the clockhead with respect to said required radius indicator.

2. The method of claim 1 further comprising:

utilizing a hard disk drive base assembly with a cutaway portion for a base of said STW clockhead jig, said cutaway portion providing visual access to a disk within said STW clockhead jig.

3. The method of claim 1 further comprising:

utilizing a clear disk within said STW clockhead jig, said clear disk having a marking thereon, said marking indicating the required radius setting for aligning said clockhead.

4. The method of claim 1 further comprising:

utilizing a disk having a clear portion within said STW clockhead jig, said clear portion indicating the required radius setting for aligning said clockhead.

5. The method of claim 1 further comprising:

utilizing a disk within said STW clockhead jig, said disk having a marking thereon, said marking indicating the required radius setting for aligning said clockhead.

6. The method of claim 1 further comprising:

providing a visual magnifying apparatus with said STW clockhead jig.

7. The method of claim 1 further comprising:

providing a manual adjuster for manually adjusting the clockhead alignment with respect to said required radius indicator.

8. The method of claim 1 further comprising:

providing an auto-adjuster for automatically adjusting the clockhead alignment with respect to said required radius indicator.

\* \* \* \* \*